United States Patent
Dennis et al.

(10) Patent No.: US 9,511,706 B2
(45) Date of Patent: Dec. 6, 2016

(54) CARGO RESTRAINING DEVICE

(71) Applicants: Richard Dennis, Los Osos, CA (US); William Summers, Richmond, CA (US)

(72) Inventors: Richard Dennis, Los Osos, CA (US); William Summers, Richmond, CA (US)

(*) Notice: Subject to any disclaimer, the term of this patent is extended or adjusted under 35 U.S.C. 154(b) by 0 days.

(21) Appl. No.: 14/967,074

(22) Filed: Dec. 11, 2015

(65) Prior Publication Data
US 2016/0167562 A1  Jun. 16, 2016

Related U.S. Application Data

(60) Provisional application No. 62/091,463, filed on Dec. 12, 2014.

(51) Int. Cl.
*B60P 7/08* (2006.01)
*B60P 7/135* (2006.01)

(52) U.S. Cl.
CPC .............. *B60P 7/0892* (2013.01); *B60P 7/135* (2013.01)

(58) Field of Classification Search
CPC ............................. B60P 7/0892; B60P 7/135
USPC ........... 410/94, 95, 117, 121, 155; 280/759; 248/351, 357
See application file for complete search history.

(56) References Cited

U.S. PATENT DOCUMENTS

| | | | |
|---|---|---|---|
| 4,733,899 A | 3/1988 | Keys | |
| 4,737,056 A | 4/1988 | Hunt | |
| 4,770,579 A * | 9/1988 | Aksamit | B60P 7/15 410/120 |
| 5,865,580 A * | 2/1999 | Lawrence | B60P 7/0892 410/117 |
| 6,763,985 B1 | 7/2004 | Stephenson, Sr. et al. | |

* cited by examiner

*Primary Examiner* — Stephen Gordon

(57) ABSTRACT

A restraining device including a bag filled with a ballast and sealed on all sides. When filled with predetermined amount of ballast, the restraining device is flexible and conforms to the shape of a cargo and a vehicle cargo area in a horizontal and or vertical dimension. The restraining device secures cargo in a vertical dimension while creating extra friction between the cargo and a cargo bed to prevent or reduce horizontal movement of the cargo. The restraining device interacts with cargo in a solely horizontal function by wrapping it around the horizontal base perimeter of the cargo. In this case, the friction between the restraining device and the cargo bed creates a barrier for the cargo thereby preventing or reducing horizontal movement of the cargo.

20 Claims, 5 Drawing Sheets

CARGO RESTRAINING DEVICE

CROSS-REFERENCE TO RELATED APPLICATIONS

The present Utility patent application claims priority benefit of the [U.S. provisional application for patent Ser. No. 62/091,463 entitled "NOODLE BUDDY", filed on 2014 Dec. 12, under 35 U.S.C. 119(e). The contents of this related provisional application are incorporated herein by reference for all purposes to the extent that such subject matter is not inconsistent herewith or limiting hereof.]

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to vehicle accessories. More particularly, the invention relates to a device that may be used to restrain cargo in a vehicle.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. In some instances it may be difficult to maintain the position of cargo in a moving vehicle as the forces of vehicular travel may tend to cause cargo to shift horizontally or lift vertically. For example, without limitation, high winds experienced in an exposed cargo bed such as, but not limited to the bed of a pickup truck may cause cargo to move around the cargo area or may even blow items from the cargo area. Furthermore, forces imposed on cargo from average acceleration, deceleration, and turning events whether in an exposed or enclosed cargo area may cause cargo to shift, tip over, or roll around the cargo area. It is contemplated that some individuals may want to secure cargo within their vehicles to minimize or prevent such movement.

By way of educational background, another aspect of the prior art generally useful to be aware of is that there are some currently available means for restraining cargo within a moving vehicle. For example, without limitation, ratchet straps, ropes, or bungee cords may be used to restrain cargo by attaching to one or more anchor points on the vehicle and extending across or attaching to the cargo. These restraint apparatuses may be attached to the anchor points and/or the cargo using a multiplicity of suitable means such as, but not limited to, hooks, various different knots, clamps, etc. Such approaches may require multiple straps, ropes or cords or the use of a long length of strap, rope, or cord wrapped around the cargo a number of times to restrain the cargo in more than one dimension, for example, without limitation, side to side, front to back, and vertically. Such approaches may be relatively time consuming to safely and effectively secure cargo. In some applications, cargo nets may be used to restrain cargo by draping the net over the cargo and securing the net at several anchor points on the vehicle.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a diagrammatic top view of the exemplary cargo restraining device. FIG. 1B is a front perspective view of cargo restraining devices in use on top of cargo, and FIG. 1C is a front perspective view of a cargo restraining device in use around cargo;

FIG. 4A is a front perspective view, and FIG. 4B is a side perspective view.

Figure 1A:
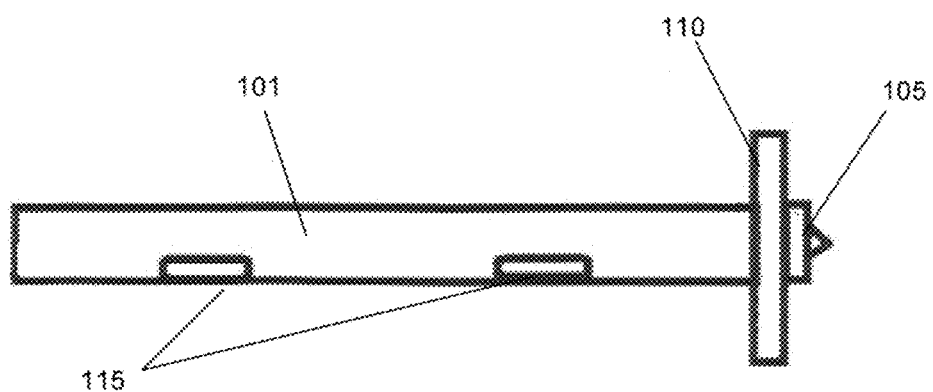
FIGS. 1A through 1C illustrate an exemplary cargo restraining device, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron [Separations, Inc., 66 F.3d 1211, 1217, 36 USPQ2d 1225, 1229 (Fed. Cir. 1995) where it is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/ services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/ components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

One embodiment of the present invention may provide an easy to use automobile/truck accessory that may aid in restraining cargo in a vehicle, for example, without limitation, in a truck bed, a contractors van, a car trunk, an SUV cargo area, etc. Some embodiments may be utilized without the need for hooks or anchoring devices on the vehicle or on the restraining device to effectively and safely secure cargo. In addition, for some types of cargo, some embodiments may be able to secure cargo in multiple dimensions, for example, without limitation, side to side, front to back, and vertically. Furthermore, some embodiments may be implemented quickly to effectively secure cargo in a vehicle.

Figure 1B:
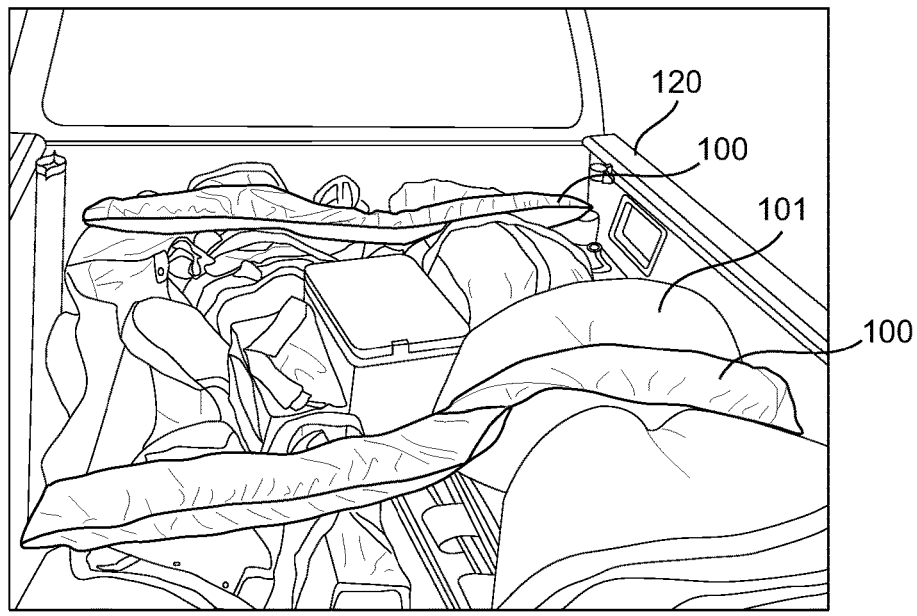
Figure 1C:
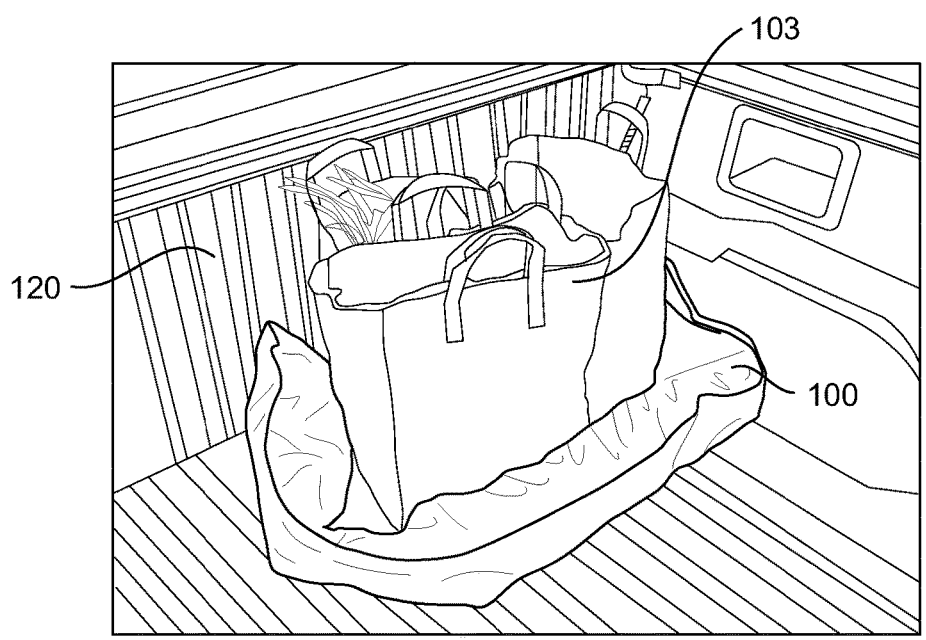

FIGS. 1A through 1C illustrate an exemplary cargo restraining device, in accordance with an embodiment of the present invention. FIG. 1A is a diagrammatic top view of the exemplary cargo restraining device. FIG. 1B is a front perspective view of cargo restraining devices 100 in use on top of cargo 101, and FIG. 1C is a front perspective view of a cargo restraining device 100 in use around cargo 103. In the present embodiment, the restraining device comprises a long, slender bag 101 made of a durable textile and fastened on three sides with industrial strength stitching. In some embodiments, various different types of thread and/or stitching patterns may be used to fasten the closed sides of the bag. For example, without limitation, in some embodiments V-138 weight, (bonded) ultraviolet resistant (UVR) polyester thread may be used to fasten the bag using a bartack stitch. Other non-limiting examples of materials that may be used to seal the bags in some alternate embodiments may include, without limitation, cotton, polyester, silk, metallic, plastic, rayon, nylon, wool, heavy-duty and machine threads, etc. In addition, some embodiments may be stitched together using various different stitches, such as, but not limited to, machine stitches including, without limitation, a backstitch, a chain stitch, a lock stitch, a zigzag stitch, a stretch stitch, an overlock stitch, a cover stitch, a running stitch, a satin stitch, or an outline stitch, and hand stitches including, but not limited to, back tack, backstitch, basting, a blanket stitch, a blind stitch, hemstitch, a buttonhole stitch, a chain stitch, cross stitching, a catch stitch, cross-stitch tack, darning, embroidery stitches, hemming, an overcast stitch, a pad stitch, a pick stitch, a running stitch, a zoo stitch, a slip stitch, tent, a top stitch, a whip stitch, etc. Moreover, in some embodiments, staples, rivets, snaps, buttons, clamps, hook and loop material, zippers, laser seaming, dialectic heat sealing, ultrasonic and dialectic welding, heat fusion of product materials, or adhesives may be used to fasten the closed sides to create the bag. In some embodiments a fabric that may be fashioned by being extruded into a tube shape may be used to form the bag so that the fabric comprises two open ends. In these embodiments only one end of the tube may need to be sealed to form the bag. In the present embodiment, bag 101 may be made of 22 oz vinyl coated polyester, which is typically mildew and UV resistant. It is contemplated that some embodiments may be made of a multiplicity of suitable materials including, but not limited to, different types of vinyl, rubber, cotton, Kevlar®, textile, polyester, recycled polyethylene terephthalate (PET), nylon, denier and denier variations, canvas and canvas variations, elastic, vinyl coated polyester, silicon coated materials, Condura®, elastomer composite, mesh, PVC backed polyester, neoprene fabric and neoprene fabric variations, Toughtek®, Rhinotek®, Reprotek® and other proprietary fabrics, etc. In some embodiments, the materials used to form the bag may be selected to optimize friction between the device and cargo, cargo and the vehicle, the device and the vehicle, etc. In some embodiments the material of the device may comprise a texture or coating, which may enhance friction between the device and the cargo area and the cargo. For example, without limitation, the material in some embodiments may have a rough texture, and other embodiments may be implemented with a rubberized coating.

In the present embodiment, bag 101 comprises an open end 105 where ballast may be added to bag 101. In the present embodiment, 17-25 pounds of ballast may typically be added to bag 101 as it is believed that this weight range may typically be heavy enough to restrain most cargo yet light enough to enable most users to handle the restraining device. Those skilled in the art will readily recognize, in light of and in accordance with the teachings of the present invention, that restraining devices according to some embodiments may be filled to weights that are heavier or lighter than 17-25 lbs. depending on various different factors such as, but not limited to, the preference of the user, the type of cargo being restrained, the type of vehicle, etc. In the present embodiment, bag 101 may typically be filled with sand. However, a multiplicity of suitable materials may be used for the ballast including, without limitation, dirt, gravel, pea gravel, pebbles, marbles, metal pellets, plastic pellets, rock, bark, water, any combination of the above, etc. Once bag 101 is filled with ballast, open end 105 may be secured shut with closure means 110. For example, without limitation, in some embodiments the closure means may comprise hook and loop material interior to the open end of the bag. In other embodiments, the open end 105 is a valve and the closure means 110 may comprise a valve closure. This same end of the bag may then be folded over one or more times and secured again with attached straps made of hook and loop material that may fasten to corresponding hook and loop material on the body of the bag or on other portions of the straps. This closure means is similar to closure means typically found on a "dry bag". It is contemplated that a multiplicity of suitable closure means may be used in some alternate embodiments such as, but not limited to, different types of hook and loop closures, buttons, rivets, clips, zippers, buckles, snaps, hooks, etc. Other alternate embodiments may be sealed on all four sides using various different closure means including, without limitation, adhesives, sewing, heat sealing, etc.

In the present embodiment, bag 101 may also comprise one or more nylon straps 115 on one or both sides of bag 101, which may be used as handles for maneuvering the device around or on top of cargo. In some alternate embodiments, the straps may be made of various different materials such as, but not limited to, polypropylene, polyester, jute, composite, nylon, virtually any polymer based webbing, various types of plastic, vinyl, rope, rubber, textile, foam, wood, polymer, etc. Some embodiments may comprise a loop at one or both ends of the bag, which may enable a user to attach two or more cargo restraining devices together or to connect one end of the device to the opposite end to create a circle. It is contemplated that any number of variations of loops and or handles may be included, without limitation, on some embodiments for ease of use and linking devices if desired, as linking devices may allow for the restraint of larger cargo. For example, without limitation, multiple loops may be placed along the sides of the bag, which may be used as additional tie-down options, as hooks, for connecting multiple devices together, etc. Other embodiments may comprise buckles on the ends of the bag with a male buckle at one end and a female buckle at the other end, which may enable the ends of the device to be connected to create a circle or to connect multiple devices in a chain. The buckles in these embodiments may be attached to the device in various different locations and may be attached in a fixed manner or attached with changeable means such as, but not limited to, adjustable straps, hook and loop material, snaps, etc. In another non-limiting example, two handles may be placed on each side of the bag or at each end of the bag to enable two users to manipulate the device. Yet other embodiments may be implemented without handles or loops. Those skilled in the art will readily recognize, in light of and in accordance with the teachings of the present invention, that a multiplicity of suitable attachment devices and other features may be included without limitation on some embodiments such as, but not limited to, straps, rope, cords, netting, eyelets, hooks, pockets, etc.

In typical use of the present embodiment, when filled with an appropriate amount of ballast, the cargo restraining device is normally flexible and may be able to conform to the shape of almost any cargo and vehicle cargo area in a horizontal and/or vertical dimension. A user may typically be able to quickly and easily employ the device as the device usually does not require hooks or any other anchoring means in the cargo area of the vehicle or on the device for the device to restrain cargo. Referring to FIG. 1B, in some applications the weight of devices 100 may be enough to secure cargo 101 in a vertical dimension and typically prevent cargo 101 from lifting up and sometimes out of a cargo area 120 of a vehicle. In addition, the added weight from devices 100 may also create extra friction between cargo 101 and cargo area 120 to help prevent or reduce horizontal movement of cargo 101. In some applications, devices 100 may also help prevent large objects from shifting or rolling within cargo area 120, for example, without limitation, table saws, other large tools, lawn mowers, furniture pieces, etc. Alternatively, referring to FIG. 1C, device 100 may interact with cargo 103 in a horizontal function by wrapping device 100 around the horizontal base perimeter of cargo 103. In this case, the friction between device 100 and cargo area 120 may create a barrier for cargo 103, which may prevent or reduce horizontal movement of cargo 103. This may help to prevent sliding, tipping, and rolling of certain cargo items that may not be effectively restrained with other methods such as, but not limited to, groceries, sports equipment, balls, retail bags, etc. In some embodiments a texture or coating may be added to the external material of the device, which may enhance friction and "hold". In the present embodiment, the flexibility of device 100 in both physical form and orientation within cargo area 120 may enable device 100 to secure a diverse range of objects in three dimensions, for example, without limitation, front to back, side to side, and up and down. In some applications, an embodiment of the present invention may be used in conjunction with other cargo restraint devices or attachment means in the cargo area such as, but not limited to, cargo nets, bungee cords, rope, hooks, latches, etc. In other applications, an embodiment of the present invention may be used as weight down for curtains, tents, etc. used in construction and other skilled trade industries. In alternative applications, an embodiment of the present invention may be used to direct or stop the flow of air or water.

Some embodiments of the present invention may be used in almost any environment where the forces of vehicular travel may tend to cause cargo to shift horizontally or lift vertically. These environments may include, without limitation, situations where high winds may be experienced in an exposed cargo bed or situations where forces may be imposed on cargo from average acceleration, deceleration, and turning events whether in an exposed or enclosed cargo area. Since many embodiments do not require the device to be attached to anchoring devices or mechanical hardware, these embodiments may typically be utilized quickly and easily and usually without the need to tie a knot. Furthermore, cargo restraining devices in accordance with some embodiments may be stored in the same format in which they are utilized; thus there is typically no mess or clean up, and storage areas may be maintained in a tidy manner. It is contemplated that virtually anyone may be able to use various embodiments of the present invention. For example, without limitation, contractors may secure their tools and other supplies in the cargo area of their vehicles, homeowners may secure supplies for home projects, travelers may secure luggage, shoppers may secure their purchases, gardeners may protect a truck full of plants from tipping or sliding, persons seeking recreation may secure items such as, but not limited to, bikes, surfboards, kayaks, etc. Typically, securing such cargo with a restraining device according to an embodiment of the present invention may help protect the cargo from damage by not allowing the cargo to shift during transit, and may help prevent the cargo from scattering and making an mess in the vehicle cargo area.

Figure 2:
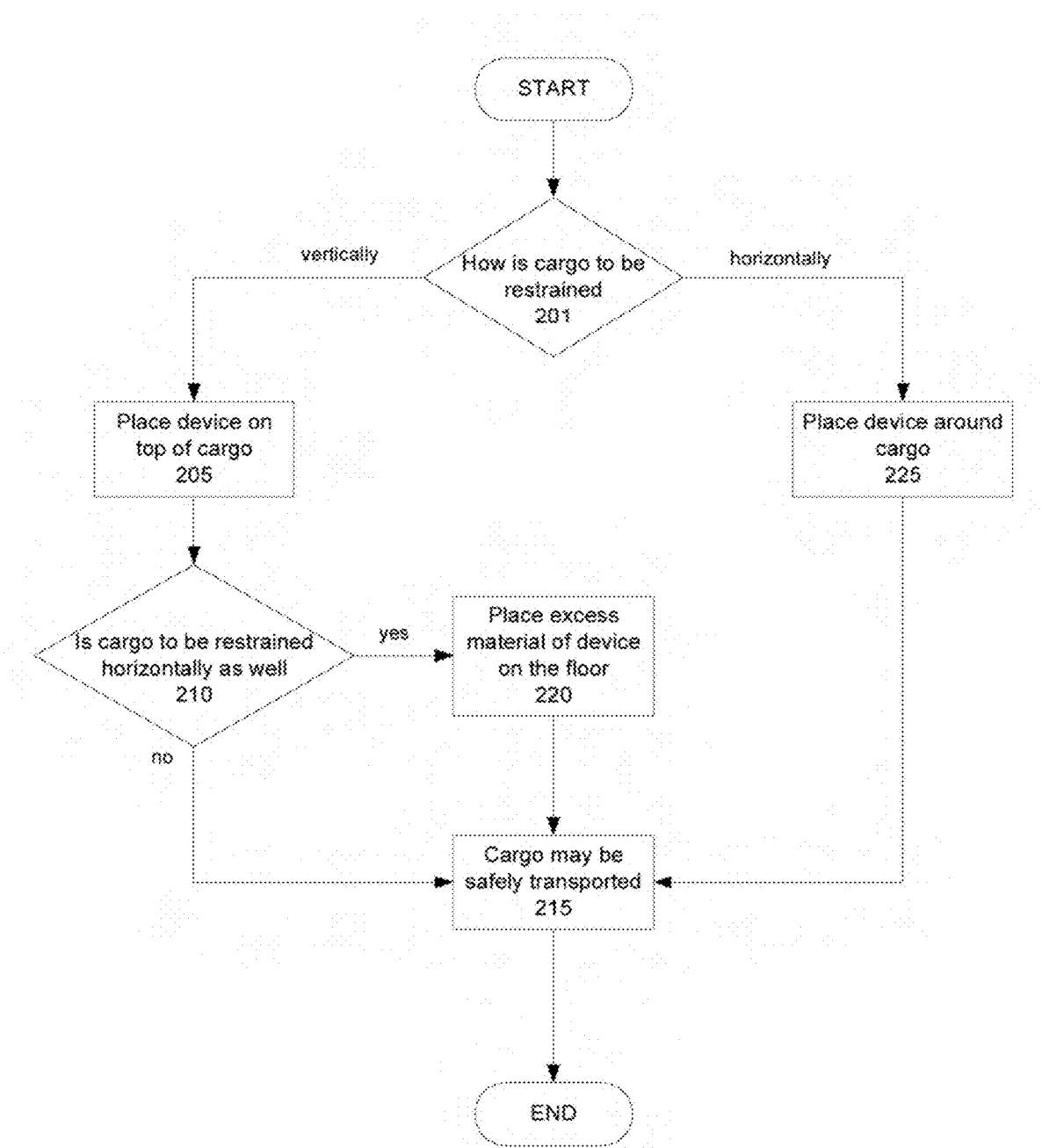
FIG. 2 is a flowchart illustrating exemplary methods for using a cargo restraining device, in accordance with an embodiment of the present invention.

FIG. 2 is a flowchart illustrating exemplary methods for using a cargo restraining device, in accordance with an embodiment of the present invention. In the present embodiment, a user first determines in step 201 how the cargo is to be restrained. The user may use the restraining device to restrain the cargo vertically, horizontally, or horizontally and vertically. If the user wishes to secure the cargo vertically, the user may place the device directly on top of the cargo in step 205, as illustrated by way of example in FIG. 1B. The placement of the device may be facilitated with the use of the provided handles for maneuvering the device. However, some users may place the device without the use of the handles, and some embodiments may be implemented without handles. The weight and flexibility of the device typically enables the device to conform to the shape of the cargo thereby "draping" the cargo in weight to typically hold the cargo in place. In step 210 it is determined if the cargo is to be restrained in the horizontal dimension as well. If not, the secured cargo may typically be safely transported in step 215. In this application the restraining device may be useful for helping to prevent lightweight objects from flying out of an open cargo area without the use of hooks or anchoring devices. A non-limiting example of this application may be to help prevent an empty cardboard box from achieving lift and flying out of the back of a pickup truck at high speeds. In some applications, placing the device on directly on top of cargo may also help prevent large objects such as, but not limited to, furniture or large tools from shifting or tipping over within the cargo area.

If in step 210 the user wishes to restrain the cargo horizontally as well, excess material of the restraining device that extends beyond the perimeter of the cargo may be positioned to make contact with the floor of the cargo area in step 220. This may enable the device to create more friction with the floor, which may further minimize horizontal movement of the cargo. The weight of the device alone, even without making contact with the floor of the cargo area typically increases the friction of the cargo relative to the floor. Therefore, in some applications the cargo may be restrained in both the vertical and horizontal planes by simply placing the device directly on top of the cargo without making contact with the floor, and step 220 may be omitted. Once the cargo is secured, the cargo may be safely transported in step 215 without moving horizontally or vertically, for example, without limitation, front to back, side to side, up and down, etc. In this application, the device may help prevent lightweight cargo from achieving lift and flying out of the back of an open cargo area. A non-limiting example of this application may be to drape the device over a surfboard to help prevent the surfboard from flying out of the back of a moving truck or shifting during acceleration, deceleration, or turning thereby helping to protect the delicate fiberglass of the surfboard from damage.

If the user only wishes to secure the cargo horizontally in step 201, for example, without limitation, front to back and side to side, the user may place the device around the cargo in step 225. The user may do this by curving the device to typically create a shape conforming "barrier" around the perimeter of the cargo, as illustrated by way of example in FIG. 1C. Due to the weight of the device and the friction created between the device and the floor of the cargo area, the device may effectively act as a berm by which the cargo typically cannot slide during average acceleration, deceleration, and turning events, even without the use of hooks or other anchoring devices. A non-limiting example of this application may be to wrap the device around the base of a load of groceries to help prevent the groceries from sliding around the cargo area.

Those skilled in the art will readily recognize, in light of and in accordance with the teachings of the present invention, that some embodiments of the present invention may be used in a multitude of applications including, without limitation, various different cargo restraining applications and other types of applications. For example, without limitation, in some embodiments the device may be used as dead weight in a variety of applications such as, but not limited to, in photography to help prevent tripods from tipping over, in road construction to help prevent temporary highway signs from tipping over, in pest management to secure fumigation tents to the ground, in health and fitness to act as weight to increase exercise energy exertion. Some alternate embodiments may be implemented to form a dam to confine water or other fluids to a desired location. Other alternate embodiments may be used to build temporary walls or structures, as counterweights, as resting devices for aiming firearms, cameras, etc., as traction supplements for vehicles, as a chock, etc.

Figure 3:
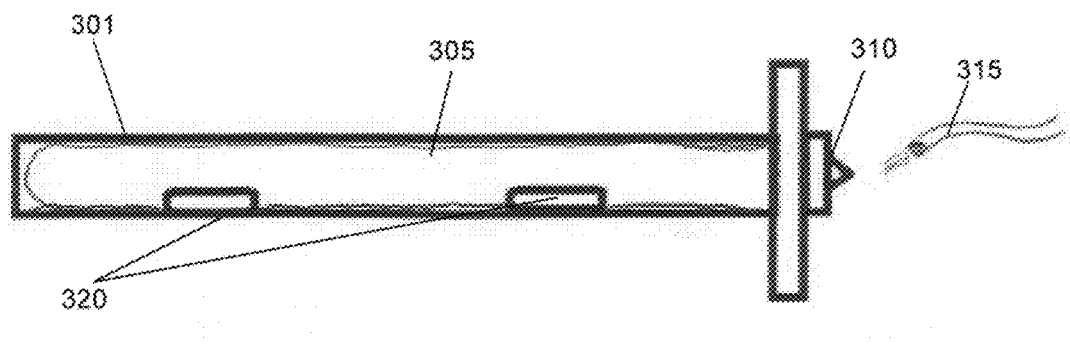
FIG. 3 is a diagrammatic top view of an exemplary cargo restraining device using water as ballast, in accordance with an embodiment of the present invention.

FIG. 3 is a diagrammatic top view of an exemplary cargo restraining device using water as ballast, in accordance with an embodiment of the present invention. In the present embodiment, the restraining device comprises a long slender bag 301 and an internal bladder 305 to hold the water ballast. In some embodiment a balloon like bladder can be used as the internal bladder or may be used as the bag itself to hold water. In the present embodiment, water may be pumped into an open end 310 of bag 301 and bladder 305 with a hose 315 or any other suitable means for filling bladder 305 with water. Open end 310 may be closed with a water tight seal such as, but not limited to, a screw cap, a one way valve, a hose connection, sewing, adhesive, heat fusing, etc. The present embodiment also comprises straps 320, which may act as handles. However, some embodiments using water as ballast may be implemented without handles or straps. Some embodiments may comprise loops, straps, eyelets, buckles, etc. in various different configurations. Furthermore, some alternate embodiments with internal bladders may be filled with various different fluids such as, but not limited to, antifreeze, plant byproducts, glycols, etc. Yet other alternate embodiments may be filled with non-liquid ballast such as, but not limited to, sand, pebbles, foam, metal or plastic pellets, etc.

Figure 4A:
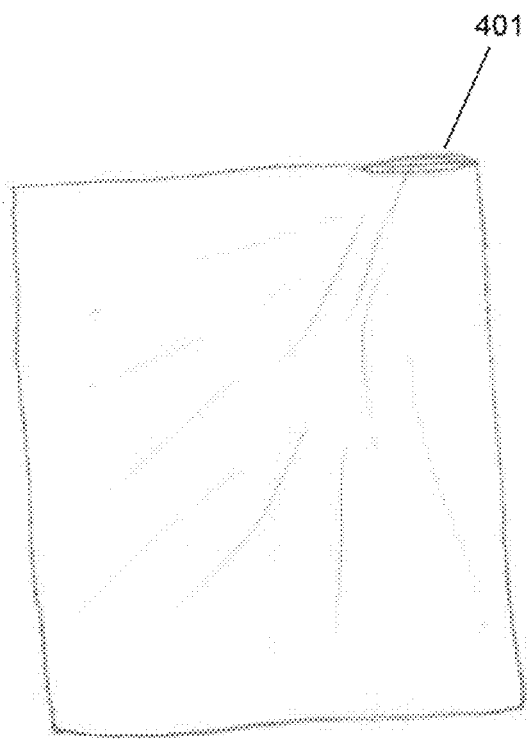
FIGS. 4A and 4B illustrate an exemplary cargo restraint device, in accordance with an embodiment of the present invention.
Figure 4B:
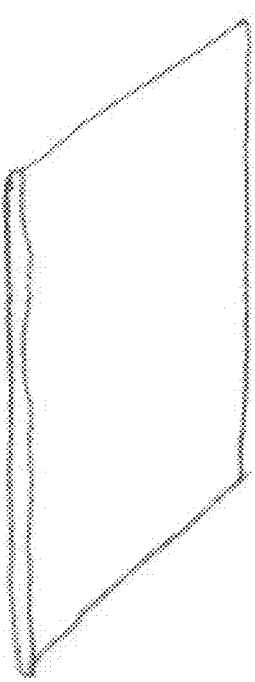

FIGS. 4A and 4B illustrate an exemplary cargo restraint device, in accordance with an embodiment of the present invention. FIG. 4A is a front perspective view, and FIG. 4B is a side perspective view. In the present embodiment, the cargo restraint devise is configured in a wide "blanket" shape that may be draped completely over cargo in some applications. A sealable opening 401 may enable a user to fill the device with a chosen type of ballast. Some embodiments may be prefilled with ballast and permanently sealed rather than comprising an opening. In some embodiments, a "blanket" shaped device may comprise straps, handles, loops, eyelets, buckles, cords, etc. in various different configurations. Those skilled in the art will readily recognize, in light of and in accordance with the teachings of the present invention, that some embodiments may be implemented with various different shapes and dimensions. For example, without limitation, some embodiments may take the shape of a shorter or longer bag, a large square bag that covers the entire cargo area or portion thereof, round bags, large bags, small bags, spherical bags, cube-shaped bags, extruded fabric tube-shaped bags, x-shaped bags, etc.

It is contemplated that some embodiments of the present invention may comprise a multiplicity of suitable additional or alternative features such as, but not limited to, eyelets or large holes around the borders of the device to enable bungee cords or ropes to be strung between multiple devices or to attach the device to a latch, hook, loop, or other attachment means. In some embodiments bungee cords and/or hooks may be incorporated into the device to provide additional uses. For example, without limitation, one embodiment may comprise a continuous bungee cord or multiple lengths of bungee cord attached to the device intermittently to provide a system for attaching the device to attachment means in the vehicle, directly to the cargo through the bungee loops themselves, to other restraining devices, etc. Some embodiments may comprise one or more utility pockets for holding items such as, but not limited to, carabineers, cords, bungees, other hardware, etc. Some embodiments may comprise additional items including, but not limited to, detachable straps, ballast volume indicator marks, a soft cover to protect cargo from scratches, etc.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "means for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a cargo restricting device according to the present invention will be apparent to those skilled in the art. Various aspects of the invention have been described above by way of illustration, and the specific embodiments disclosed are not intended to limit the invention to the particular forms disclosed. The particular implementation of the cargo restricting device may vary depending upon the particular context or application. By way of example, and not limitation, the restricting devices described in the foregoing were principally directed to flexible implementations; however, similar techniques may instead be applied to devices made of less flexible materials such as, but not limited to, hard plastic, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising;
    means for restraining at least one cargo item;
    means for adding a predetermined amount of weight to said restraining means;
    means for containing said weight adding means;
    means for holding said weight adding means;
    means for stitching at least one open portion of said containing means;
    means for allowing said weight adding means to be generally added to said restraining means;
    means for sealing said allowing means;
    means for protecting said restraining means from environmental elements;
    means for maneuvering said restraining means around or on top of said cargo item.

2. An apparatus comprising;
    a restraining device, said restraining device being configured to restrain at least one cargo item generally disposed in a cargo area, in which said device comprising;
    a ballast material, said ballast material comprising a predetermined amount of weight material being operable to add weight to said restraining device, wherein said added weight is configured to create friction between said cargo item and said cargo area, and wherein said added weight is operable to prevent or reduce movement, shifting, rolling or sliding of said cargo item;
    a bag, said bag comprising an elongated and flexible bag being configured to contain said predetermined amount of weight material, in which said bag comprising at least two end portions;
    a textile material, said textile material comprising a durable and flexible textile material being configured to hold said predetermined amount of weight material;
    a stitching portion, said stitching portion comprising at least one open portion of said bag;

a stitching material, said stitching material comprising an industrial strength stitching material, wherein said stitching portion is sealed with said industrial strength stitching material;

an open end portion, said open end portion comprising at least one open end portion of said at least two end portions, wherein said open end portion being configured to allow said weight material to be generally added to said device;

a closure means, wherein said closure means is configured to seal said open end portion;

a mildew resistant material, in which said textile material comprising said mildew resistant material, wherein said mildew resistant material is configured to protect said device from mildew;

a UV resistant material, in which said textile material further comprising said UV resistant material, wherein said UV resistant material is configured to protect said device from environmental elements;

a strap, said strap comprising at least one strap being operable for maneuvering said device around or on top of said cargo item.

3. The apparatus of claim 2, in which said bag comprising one of a short bag, long bag, a large square bag that generally covers an entire cargo area or a portion thereof, a round bag, large bag, small bag, spherical bag, cube-shaped bag, extruded fabric tube-shaped bag, or x-shaped bag, wherein said restraining device is further configured to restrain said cargo item in three dimensions.

4. The apparatus of claim 2, in which said stitching material comprising a V-138 weight, bonded ultraviolet resistant (UVR) polyester thread being configured to fasten said bag on three sides, in which said restraining device is configured to conform to a shape of said cargo item in a horizontal or vertical dimension.

5. The apparatus of claim 2, wherein said restraining device is stitched together using machine stitches including one of a backstitch, a chain stitch, a lock stitch, a zigzag stitch, a stretch stitch, an overlock stitch, a cover stitch, a running stitch, a satin stitch, and an outline stitch, or using hand stitches including one of a back tack, a backstitch, a basting, a blanket stitch, a blind stitch, a hemstitch, a buttonhole stitch, a chain stitch, a cross stitching, a catch stitch, cross-stitch tack, darning, embroidery stitches, hemming, an overcast stitch, a pad stitch, a pick stitch, a running stitch, a zoo stitch, a slip stitch, a tent, a top stitch, and a whip stitch.

6. The apparatus of claim 2, in which said textile material comprising one of vinyl, rubber, cotton, Kevlar®, textile, polyester, recycled polyethylene terephthalate (PET), nylon, denier and denier variations, canvas and canvas variations, elastic, vinyl coated polyester, silicon coated materials, Condura®, elastomer composite, mesh, PVC backed polyester, neoprene fabric and neoprene fabric variations, Toughtek®, Rhinotek®, or Reprotek®.

7. The apparatus of claim 2, in which said textile material comprising 22 oz vinyl coated polyester, and in which said textile material is substantially mildew and UV resistant material.

8. The apparatus of claim 2, in which said textile material comprising a texture or coating which is configured to enhance friction between said restraining device, a cargo area, and said cargo item.

9. The apparatus of claim 3, in which said ballast comprise of sand, wherein said ballast material comprises sand and said bag is filled with said sand.

10. The apparatus of claim 3, in which said ballast comprises one of sand, dirt, gravel, pea gravel, pebbles, marbles, metal pellets, plastic pellets, rock, bark or water.

11. The apparatus of claim 2, in which said closure means comprises a hook and loop device disposed on a generally interior portion of said open end portion.

12. The apparatus of claim 2, in which said closure means comprises one of buttons, rivets, clips, zippers, buckles, snaps, hooks, adhesives, sewing, or heat sealing.

13. The apparatus of claim 2, in which said strap further comprising at least two nylon straps generally disposed on opposite side portions of said bag, in which said at least two nylon straps comprise handles being operable for maneuvering said restraining device around or on top of said cargo item.

14. The apparatus of claim 2, in which said strap further comprising one of polypropylene, polyester, jute, composite, nylon, polymer based webbing, plastic, vinyl, rope, rubber, textile, foam, wood, or polymer.

15. The apparatus of claim 2, in which said restraining device further comprising at least one loop at one or both end portions of said bag, wherein said loop is operable for attaching two or more restraining devices together.

16. The apparatus of claim 2, in which said restraining device further comprising buckles generally disposed on proximate ends of said bag, wherein a male buckle of said buckles is generally disposed at one end of said bag and a female buckle of said buckles is generally disposed at another of the ends of said bag, and in which ends of said device being configured to be connected to create a circle or to connect multiple devices in a chain.

17. The apparatus of claim 2, in which said restraining device further comprising at least two handles generally disposed on opposite sides of said bag and being operable for two users to manipulate said restraining device.

18. The apparatus of claim 2, in which said at least one cargo item comprising at least one of groceries, sports equipment, tools, luggage, and travel bags.

19. The apparatus of claim 2, in which said restraining device further comprising at least one of cargo nets, bungee cords, rope, hooks, and latches.

20. An apparatus comprising;
a restraining device, said restraining device being configured to restrain at least one cargo item generally disposed in a cargo area, in which said device comprising;
a ballast material, said ballast material comprising a predetermined amount of weight material being operable to add weight to said restraining device, wherein said added weight is configured to create friction between said cargo item and said cargo area, and wherein said added weight is operable to prevent or reduce movement, shifting, rolling or sliding of said cargo item;
a bag, said bag comprising an elongated and flexible bag being configured to contain said predetermined amount of weight material, in which said bag comprising at least two end portions;
a textile material, said textile material comprising a durable and flexible textile material being configured to hold said predetermined amount of weight material;
a stitching portion, said stitching portion comprising at least one open portion of said bag;
a stitching material, said stitching material comprising an industrial strength stitching material, wherein said stitching portion is sealed with said industrial strength stitching material;

an open end portion, said open end portion comprising at least one open end portion of said at least two end portions, wherein said open end portion being configured to allow said weight material to be generally added to said device;

a closure means, wherein said closure means is configured to seal said open end portion;

a mildew resistant material, in which said textile material comprising said mildew resistant material, wherein said mildew resistant material is configured to protect said device from mildew;

a UV resistant material, in which said textile material further comprising said UV resistant material, wherein said UV resistant material is configured to protect said device from environmental elements;

a strap, said strap comprising at least one strap being operable for maneuvering said device around or on top of said cargo item;

an internal bladder, in which said internal bladder is generally disposed proximate an inner portion of said restraining device, and in which said ballast material comprising liquid material, wherein said internal bladder is configured to hold said liquid ballast material.

* * * * *